(12) United States Patent
Chee et al.

(10) Patent No.: US 9,317,263 B2
(45) Date of Patent: *Apr. 19, 2016

(54) HARDWARE COMPILATION AND/OR TRANSLATION WITH FAULT DETECTION AND ROLL BACK FUNCTIONALITY

(71) Applicant: Intel Corporation, Santa Clara, CA (US)

(72) Inventors: Nicholas Cheng Hwa Chee, Gelugor (MY); Tryggve Fossum, Northborough, MA (US); William C. Hasenplaugh, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,402

(22) Filed: Oct. 14, 2014

(65) Prior Publication Data

US 2015/0046910 A1 Feb. 12, 2015

Related U.S. Application Data

(62) Division of application No. 13/341,812, filed on Dec. 30, 2011, now Pat. No. 8,893,094.

(51) Int. Cl.
*G06F 9/45* (2006.01)
*G06F 7/38* (2006.01)
(Continued)

(52) U.S. Cl.
CPC .............. *G06F 8/44* (2013.01); *G06F 9/3001* (2013.01); *G06F 9/30087* (2013.01);
(Continued)

(58) Field of Classification Search
CPC ......... G06F 8/44; G06F 8/441; G06F 9/3001; G06F 9/30087; G06F 9/30174; G06F 9/3851; G06F 9/3857; G06F 9/3863; G06F 9/462; G06F 11/0751
USPC .................. 717/140–161; 712/220, 226, 228; 714/48

See application file for complete search history.

(56) References Cited

U.S. PATENT DOCUMENTS 6,154,877 A 11/2000 Ramkumar et al.
6,161,219 A 12/2000 Ramkumar et al.
(Continued)

OTHER PUBLICATIONS

N. Riley, C. Zilles. "Transactional Runtime Extensions for Dynamic Language Performance." EPHAM, Apr. 2008, 9 pages.*
(Continued)

*Primary Examiner* — Qing Chen
(74) *Attorney, Agent, or Firm* — Mnemoglyphics, LLC; Lawrence M. Mennemeier

(57) ABSTRACT

Hardware compilation and/or translation with fault detection and roll back functionality are disclosed. Compilation and/or translation logic receives programs encoded in one language, and encodes the programs into a second language including instructions to support processor features not encoded into the original language encoding of the programs. In one embodiment, an execution unit executes instructions of the second language including an operation-check instruction to perform a first operation and record the first operation result for a comparison, and an operation-test instruction to perform a second operation and a fault detection operation by comparing the second operation result to the recorded first operation result. In some embodiments, an execution unit executes instructions of the second language including commit instructions to record execution checkpoint states of registers mapped to architectural registers, and roll-back instructions to restore the registers mapped to architectural registers to previously recorded execution checkpoint states.

28 Claims, 5 Drawing Sheets

(51) Int. Cl.
  *G06F 11/00* (2006.01)
  *G06F 9/30* (2006.01)
  *G06F 9/38* (2006.01)
  *G06F 9/46* (2006.01)
  *G06F 11/07* (2006.01)

(52) U.S. Cl.
  CPC ......... *G06F 9/30174* (2013.01); *G06F 9/3851* (2013.01); *G06F 9/3857* (2013.01); *G06F 9/3863* (2013.01); *G06F 9/462* (2013.01); *G06F 11/0751* (2013.01)

(56) References Cited

U.S. PATENT DOCUMENTS

| | | | |
|---|---|---|---|
| 6,708,288 | B1 | 3/2004 | Ziegler et al. |
| 6,988,183 | B1* | 1/2006 | Wong ............... G06F 9/30174 712/208 |
| 7,346,897 | B2 | 3/2008 | Vargas |
| 7,581,210 | B2 | 8/2009 | Shidla et al. |
| 7,716,638 | B2 | 5/2010 | Thornton |
| 8,584,102 | B2 | 11/2013 | Need et al. |
| 2002/0100029 | A1* | 7/2002 | Bowen ........................ 717/140 |
| 2003/0079209 | A1* | 4/2003 | Sinha ................... G06F 8/4441 717/150 |
| 2004/0034814 | A1* | 2/2004 | Thompson ............. G06F 8/443 714/35 |
| 2004/0103405 | A1 | 5/2004 | Vargas |
| 2005/0005153 | A1 | 1/2005 | Das et al. |
| 2005/0055674 | A1 | 3/2005 | Shidla et al. |
| 2005/0071438 | A1* | 3/2005 | Liao ..................... G06F 8/4442 709/214 |
| 2006/0020775 | A1 | 1/2006 | Madriles et al. |
| 2006/0112261 | A1* | 5/2006 | Yourst ................... G06F 9/3808 712/218 |
| 2006/0200663 | A1 | 9/2006 | Thornton |
| 2006/0242385 | A1* | 10/2006 | Murakami .......... G06F 9/30145 712/200 |
| 2008/0005332 | A1* | 1/2008 | Pande ................... G06F 9/4843 709/226 |
| 2008/0288754 | A1* | 11/2008 | Gonion ............... G06F 9/30072 712/217 |
| 2009/0172306 | A1* | 7/2009 | Nussbaum ............. G06F 9/466 711/154 |
| 2009/0172651 | A1 | 7/2009 | Need et al. |
| 2010/0023703 | A1* | 1/2010 | Christie ................. G06F 9/466 711/147 |
| 2010/0146241 | A1* | 6/2010 | Rakib ................. G06F 15/8007 712/22 |
| 2010/0199269 | A1* | 8/2010 | Hattori .................... G06F 8/443 717/146 |
| 2010/0262812 | A1 | 10/2010 | Lopez et al. |
| 2010/0269102 | A1 | 10/2010 | Latorre et al. |
| 2011/0208921 | A1* | 8/2011 | Pohlack .................. G06F 9/467 711/147 |
| 2011/0264898 | A1* | 10/2011 | Chaudhry ............. G06F 9/3842 712/228 |
| 2011/0283089 | A1* | 11/2011 | Ingale ................... G06F 9/3885 712/30 |
| 2011/0296428 | A1 | 12/2011 | Rawson et al. |
| 2011/0307689 | A1* | 12/2011 | Chung .................. G06F 9/3004 712/234 |
| 2012/0005461 | A1* | 1/2012 | Moir ..................... G06F 9/3857 712/228 |
| 2012/0079245 | A1* | 3/2012 | Wang ................. G06F 9/30072 712/208 |

OTHER PUBLICATIONS

N. Riley. "Explicit Software Speculation for Dynamic Language Runtimes." Ph.D. dissertation, University of Illinois at Urbana-Champaign, May 2009, 92 pages.*
"Getting Started with the C-to-Hardware Compiler," Altium Limited, TU0130, May 16, 2008, 23 pages.
Mueller et al., "Glacier: A Query-to-Hardware Compiler," SIGMOD'10, Jun. 6-11, 2010 Indianapolis, Indiana, 4 pages.
International Preliminary Report on Patentability (Chapter 1 of the Patent Cooperation Treaty) and Written Opinion of the International Search Authority, Korean Intellectual Property Office, PCT/US2012/071668, Mailed Jul. 10, 2014, 7 pages.

* cited by examiner

HARDWARE COMPILATION AND/OR TRANSLATION WITH FAULT DETECTION AND ROLL BACK FUNCTIONALITY

RELATED APPLICATIONS

This is a Divisional of application Ser. No. 13/341,812, filed Dec. 30, 2011, now U.S. Pat. No. 8,893,094.

U.S. GOVERNMENT RIGHTS

This invention was made with Government support under contract number H98230-11-3-0011 awarded by the Department of Defense. The Government has certain rights in this invention.

FIELD OF THE DISCLOSURE

This disclosure relates generally to the field of microprocessors. In particular, the disclosure relates to hardware compilation and/or translation with fault detection and roll back functionality.

BACKGROUND OF THE DISCLOSURE

Modern processors often include new features, for example, to improve security or support virtualization or multithreading, and/or new instructions to provide operations that are computationally intensive, but offer a high level of data parallelism that can be exploited through an efficient implementation using various data storage devices, such as for example, single instruction multiple data (SIMD) vector registers.

For many of these processors compiler adaptation lags far behind the hardware release, so the new features, instructions and/or resources are under utilized.

On the other hand, fault tolerance and fault detection features are not typically applied to these new features, instructions and/or resources in high-production processors because the implementation costs exceed the benefit. However, reducing the dimensions and increasing the number of transistors in a package and/or processing elements in a multiprocessor, while making devices faster and more efficient, increases the probability of faults due to alpha particles and other causal factors.

Additionally, there are some extreme environments in which fault tolerance is a highly desirable feature of computer systems. For example, a configurable fault tolerant processor (CFTP) was developed by the Space Systems Academic Group at the Naval Postgraduate School using field programmable gate arrays (FPGAs). It was then deployed as an experimental payload on board the United States Naval Academy's (USNA) MidSTAR-1 satellite. A second CFTP system, CFTP-2, was deployed as an entirely ground-based system and was tested in a proton beam using the University of California at Davis' cyclotron.

Binary translation is the emulation of one instruction set by another through translation of code. Sequences of instructions are translated from the source to the target instruction set. Static binary translation aims to convert all of the code of an executable file into code that runs on the target architecture without having to run the code first, as is done in dynamic binary translation. This is very difficult to do correctly, since not all the code can be discovered by the translator. For example, some parts of the executable may be reachable only through indirect branches, whose value is known only at run-time.

Dynamic binary translation looks at a short sequence of code—typically on the order of a single basic block—then translates it and caches the resulting sequence. Code is only translated as it is discovered and when possible branch instructions are made to point to already translated and saved code. In some cases such as instruction set simulation, the target instruction set may be the same as the source instruction set, providing testing and debugging features such as instruction trace, conditional breakpoints and hot spot detection. While such implementations may provide debugging and software/hardware development support, they are not typically directed to fault tolerance or fault detection. Additionally, binary translation techniques typically do little to improve utilization of new features, instructions and/or resources.

Some compiler techniques have sought to directly target features of hardware. These techniques have been applied, for example, to FPGA technology. A compiler may take high level source code as an input and compile the source code to produce FPGA logic as an output. In general, such FPGA implementations may limit performance advantages otherwise available for example, from very-large-scale integration (VLSI) and their implementations may additionally be larger and/or heavier, and may require higher supply voltages.

To date, potential solutions to such under utilization, fault tolerance, performance and efficiency limiting issues have not been adequately explored.

BRIEF DESCRIPTION OF THE DRAWINGS

The present invention is illustrated by way of example and not limitation in the figures of the accompanying drawings.

DETAILED DESCRIPTION

Figure 1:
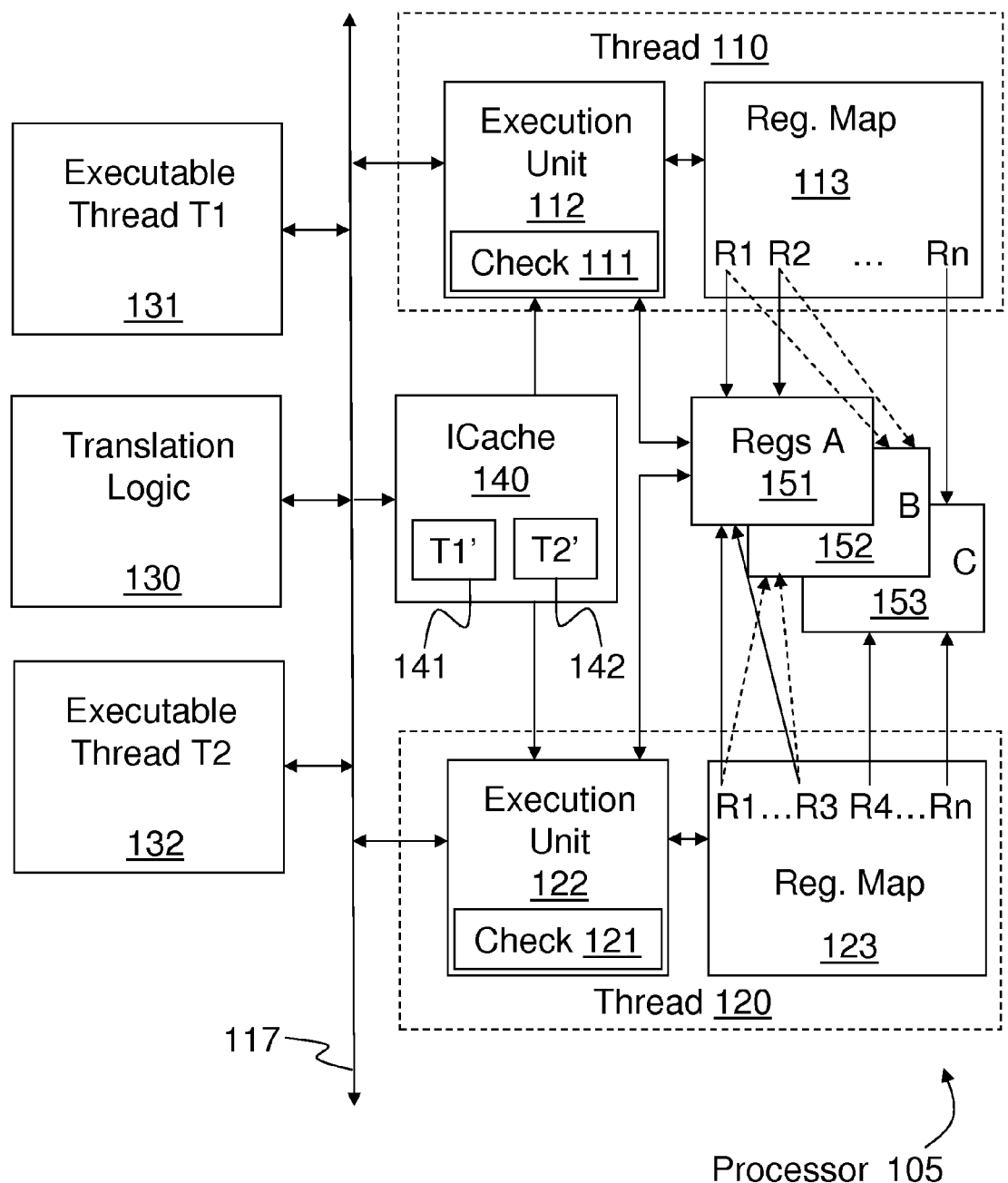
FIG. 1 illustrates one embodiment of a processor system using hardware compilation and/or translation with fault detection and roll back functionality.

Hardware compilation and/or translation with fault detection and roll back functionality are disclosed. Compilation and/or translation logic receives programs encoded in one language, and encodes the programs into a second language including instructions to support processor features not encoded into the original language encoding of the programs. In one embodiment, an execution unit executes instructions of the second language including an operation-check instruction to perform a first operation and record the first operation result for a comparison, and an operation-test instruction to perform a second operation and a fault detection operation by comparing the second operation result to the recorded first operation result. In some embodiments, an execution unit executes instructions of the second language including commit instructions to record execution checkpoint states of registers mapped to architectural registers, and roll-back instructions to restore the registers mapped to architectural registers to previously recorded execution checkpoint states.

In the disclosure that follows, terms such as threads, programs, and processes may be used interchangeably to describe embodiments of instruction sequences or command sequences of programming languages or machine languages or both, or alternatively as the executing sequences themselves or as the processing devices executing the sequences. Through hardware compilation and/or translation, instructions to support new processor features may be used to improve performance, fault tolerance, security, virus detection, etc., by recompilation, translation or instrumentation of programs previously encoded in languages, which did not have support for these new processor features. It will be appreciated that some embodiments supporting hardware compilation and/or translation with roll back functionality may, without significantly increasing implementation costs, provide fault tolerance and/or fault detection features that are atypical in high-production processors. In extreme environments where fault tolerance is a highly desirable feature of computer systems, commercial processors with hardware compilation and/or translation with roll back functionality may provide fault tolerance and/or fault detection along with advantages of high level integration, while being smaller and lighter, and having better power efficiency than other alternatives such as FPGA technology. Such features are increasingly desirable since reducing the dimensions and increasing the number of transistors in a package increases the probability of faults due to alpha particles and other causal factors.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

FIG. 1 illustrates one embodiment of a processor 105 using hardware compilation and/or translation with fault detection and roll back functionality. Processor 105 includes multiprocessing or multithreading hardware, thread 110 and thread 120 comprising respectively execution unit 112 and register map 113, and execution unit 122 and register map 123.

A compilation and/or translation logic 130 receives (e.g. via a bus 117) executable program portions, thread T1 131 and thread T2 132 encoded in one language, and encodes them into a second language to include instructions to support one or more processor 105 features not encoded into the original language encoding of executable program portions, thread T1 131 and thread T2 132. In some alternative embodiments, the original language may be, for example, a high level programming language, or an interpreted language, or a pseudo-language, or a machine language of a different processor architecture, or even the same or a similar machine language, for example of a legacy processor. In some embodiments, the original language may be generated by software or middleware from a high level language into the pseudo-language, or the machine language of a different processor architecture, or into the same or similar machine language for a legacy processor. The executable program portions, T1' 141 and T2' 142, encoded in the second language are stored, for example in Icache 140. In some embodiments, the second language may include new instructions to support new processor 105 features but may also have a base of instructions executable by processors with different micro-architectures which share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs.

Responsive to one embodiment of instructions in said second language to support new processor 105 features, execution unit 112 can execute a commit instruction to record a first execution checkpoint state of registers mapped to architectural registers (for example registers in registers A 151 mapped to R1 and R2 by register map 113 may be recorded in registers B 152 as an execution checkpoint state, while temporary storage in registers C 153 mapped to Rn by register map 113 is not recorded in the execution checkpoint state) of the executable program portion, for example T1' 141. Execution unit 122 can execute another commit instruction to record an execution checkpoint state of registers mapped to architectural registers (for example registers in registers A 151 mapped to R1 and R3 by register map 123 may be recorded in registers B 152 as an execution checkpoint state, while temporary storage in registers C 153 mapped to R4 and Rn by register map 123 are not recorded in the execution checkpoint state) of the executable program portion, for example T2' 142. Also responsive to instructions in said second language to support new processor 105 features, execution unit 112 and/or execution unit 122 can execute a rollback instruction if necessary to restore, respectively, the registers mapped to architectural registers to the most recent execution checkpoint states respectively recorded.

As one example of new processor 105 features, embodiments of thread 110 and thread 120 of processor 105 are capable of executing a series of instructions and making the net effect of the entire series visible to another process at a specific time. Thus from another thread's point of view, the series of instructions appears to have been executed atomically. In order to create this illusion, processor 105 needs to be able to roll back threads to a previous checkpoint state before the atomic execution began. There are any number of reasons why thread 110 or thread 120 may need to roll back an atomic region, e.g. to avoid deadlock due to entangled memory references, or to execute a piece of code that has been unsafely optimized with assert checks, or to correct for a fault due to alpha particles and other causal factors, or to resolve precise exceptions, or to handle interrupts etc. In some embodiments of thread 110 and thread 120 of processor 105, it may not be necessary to read or to write registers from different threads in the same cycle. It will, therefore, be appreciated that a register design may comprise a unified storage cell, containing storage cells from two different threads, but restricting access to one or the other thread and thereby simplifying the storage cell design. According to such embodiments, a storage cell design may contain three actual storage cells, e.g. from A 151, B 152 and C 153. A thread may read from A 151 or B 152, write to A 151 or B 152, move from A 151 to B 152 or move from B 152 to A 151. The lower portion of a thread's register set may be shadowed, such that it is always possible for that subset of registers (the canonical set) to roll back to a previous checkpoint state. Accordingly for some embodiments register indices may be mapped into the storage structure such that canonical registers are mapped, for example, to A 151 and to B 152 for some storage cells and the non-canonical (or temporary) registers are mapped to C 153 for some other storage cells.

Responsive to another embodiment of instructions in the second language to support new processor 105 features, execution unit 112 (or execution unit 122) can execute an operation-check instruction (such as an add-check, subtract-check, multiply-check, compute-effective-address-check, etc.) to perform an operation (such as an add, subtract, multiply, compute-effective-address, etc.) and record the operation result for a comparison using check logic 111 (or check logic 121). Execution unit 112 or execution unit 122 can also execute an operation-test instruction to perform a second operation (such as an add, subtract, multiply, compute-effective-address, etc.) and to perform fault detection by comparing the second operation result to the previously recorded operation result. For some embodiments a trap or an interrupt may be taken, for example upon detecting an inequality or upon exceeding a maximum value or upon some other condition. Alternatively a flag may be set to conditionally execute a roll-back instruction if necessary to restore the registers mapped to architectural registers to the most recent execution checkpoint state recorded prior to detection of the fault. In some embodiments operation-check instructions and operation-test instructions in the second language may be implemented by providing a check indicator and a test indicator to any operation or to a subset of operations performed by instructions of the second language. In such embodiments, a check latch in check logic 111 or in check logic 121 may be loaded with the output of the operation (along with loading of the normal output latch) whenever the check indicator is set for an operation. Similarly whenever the test indicator is set for an operation, the contents of the normal output latch may be compared to the contents of the check latch in check logic 111 or in check logic 121 to detect a fault or some other condition. A check latch may be added to an execution unit of virtually any type to enable fault detection, security checks, virus detection, debugging, etc.

Figure 2:
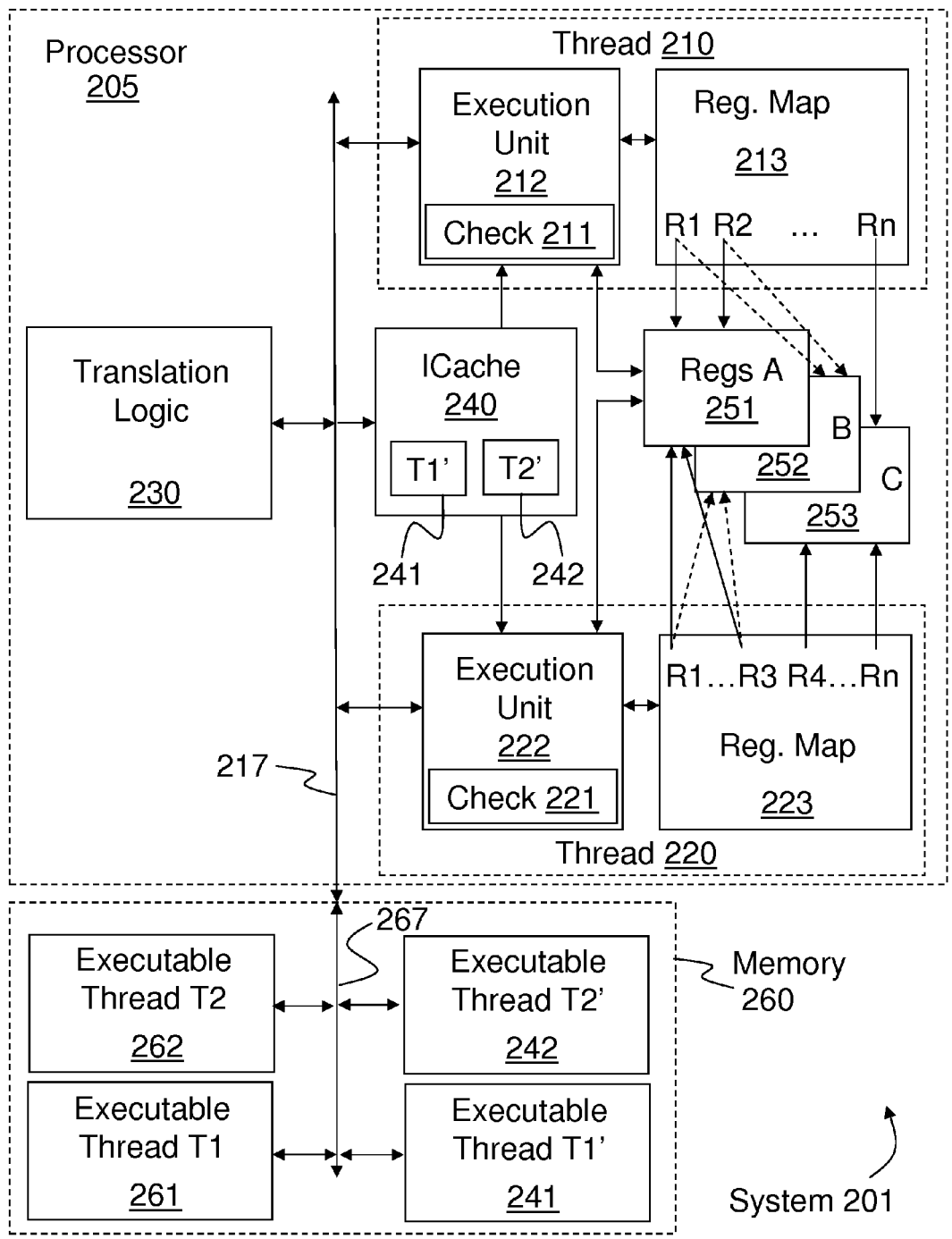
FIG. 2 illustrates one embodiment of a multiprocessing system using hardware compilation and/or translation with fault detection and roll back functionality.

FIG. 2 illustrates one embodiment of a multiprocessing system 201 using hardware compilation and/or translation with fault detection and roll back functionality. System 201 includes memory 260 and processor 205. Processor 205 includes multiprocessing or multithreading hardware, thread 210 and thread 220 comprising respectively execution unit 212 and register map 213, and execution unit 222 and register map 223. A compilation and/or translation logic 230 receives (e.g. via buses 217 and 267 from memory 260) executable program portions, thread T1 261 and thread T2 262 encoded in one language, and encodes them into a second language to include instructions to support one or more processor 205 features not encoded into the original language encoding of executable program portions, thread T1 261 and thread T2 262. In some alternative embodiments, the original language may be, for example, a high level programming language, or an interpreted language, or a pseudo-language, or a machine language of a different processor architecture, or even the same or a similar machine language, for example of a legacy processor. The executable program portions, thread T1' 241 and thread T2' 242, encoded in the second language are stored, for example in memory 260 and in Icache 240. In some embodiments, the second language may include new instructions to support new processor 205 features but may also have a base of instructions executable by processors with different micro-architectures which share at least a portion of a common instruction set. Responsive to one embodiment of instructions in said second language to support new processor 205 features, execution unit 212 can execute a commit instruction to record a first execution checkpoint state of registers mapped to architectural registers (for example registers in registers A 251 mapped to R1 and R2 by register map 213 may be recorded in registers B 252 as an execution checkpoint state, while temporary storage in registers C 253 mapped to Rn by register map 213 is not recorded in the execution checkpoint state) of the executable program portion, for example T1' 241. Execution unit 222 can execute another commit instruction to record an execution checkpoint state of registers mapped to architectural registers (for example registers in registers A 251 mapped to R1 and R3 by register map 223 may be recorded in registers B 252 as an execution checkpoint state, while temporary storage in registers C 253 mapped to R4 and Rn by register map 223 are not recorded in the execution checkpoint state) of the executable program portion, for example T2' 242. Also responsive to instructions in said second language to support new processor 205 features, execution unit 212 and/or execution unit 222 can execute a roll-back instruction if necessary to restore, respectively, the registers mapped to architectural registers to the most recent execution checkpoint states respectively recorded.

Responsive to another embodiment of instructions in the second language to support new processor 205 features, execution unit 212 (or execution unit 222) can execute an operation-check instruction (such as an add-check, subtract-check, multiply-check, compute-effective-address-check, etc.) to perform an operation (such as an add, subtract, multiply, compute-effective-address, etc.) and record the operation result for a comparison using check logic 211 (or check logic 221). Execution unit 212 or execution unit 222 can also execute an operation-test instruction to perform a second operation (such as an add, subtract, multiply, compute-effective-address, etc.) and to perform fault detection by comparing the second operation result to the previously recorded operation result. For some embodiments a trap or an interrupt may be taken, for example upon detecting an inequality or upon exceeding a maximum value or upon some other condition. Alternatively a flag may be set to conditionally execute a roll-back instruction if necessary to restore the registers mapped to architectural registers to the last execution checkpoint state recorded prior to detection of the fault.

Figure 3:
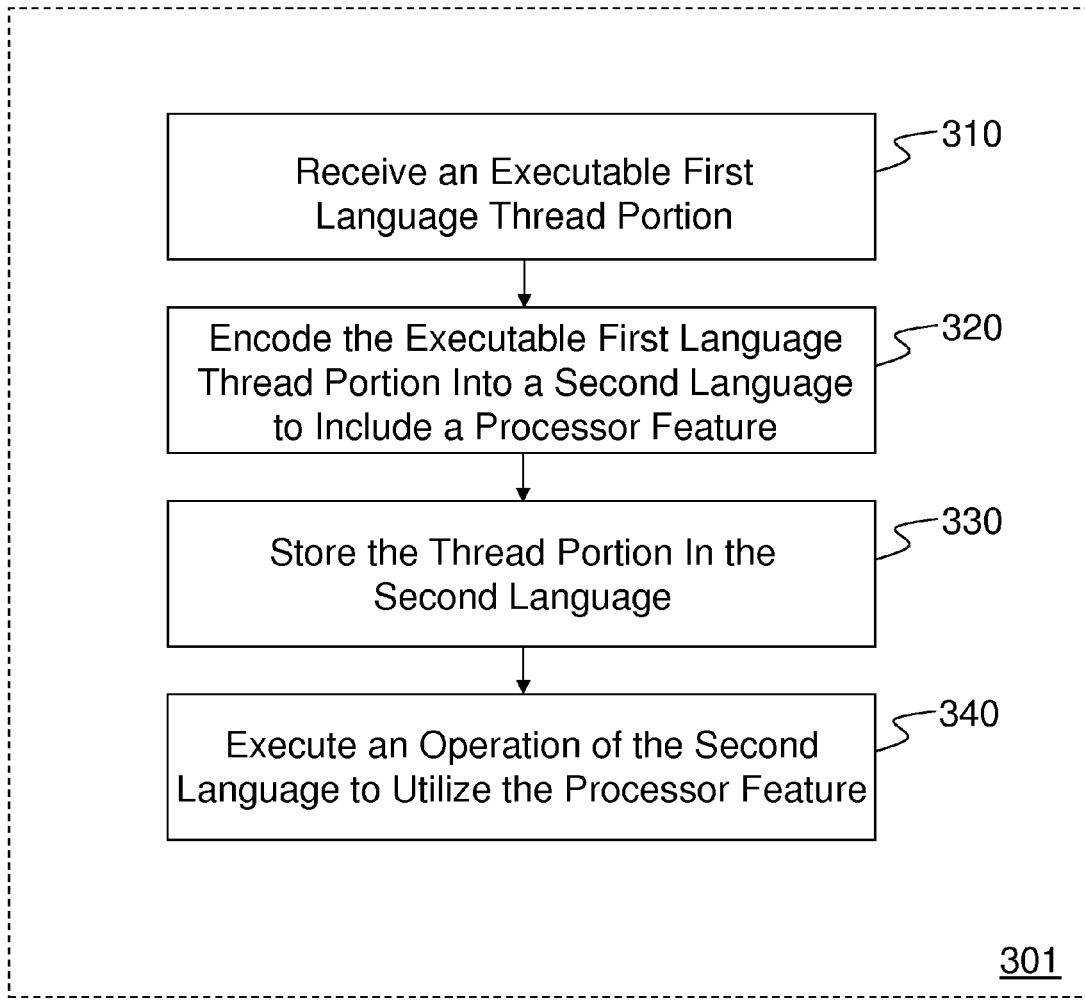
FIG. 3 illustrates a flow diagram for one embodiment of a process to use hardware compilation and/or translation with fault detection and roll back functionality.

FIG. 3 illustrates a flow diagram for one embodiment of a process to use hardware compilation and/or translation with fault detection and roll back functionality. Process 301 and other processes herein disclosed are performed by processing blocks that may comprise dedicated hardware or software or firmware operation codes executable by general purpose machines or by special purpose machines or by a combination of both.

In processing block 310 an executable thread portion is received in a processor encoded in a first language. In processing block 320 the executable thread portion is encoded into a second language to include one or more instruction to support new processor features not supported by the first language encoding. In processing block 330 the executable thread portion is stored in the second language, for example in system memory 260 and/or in a processor cache 240. In processing block 340 an operation of the executable thread portion in the second language is executed to utilize the new processor features.

It will be appreciated that process 301 may be used to improve performance, fault tolerance, security, virus detection, etc., by recompilation, translation or instrumentation of programs previously encoded in languages, which did not have support for these new processor features. It will be appreciated that such programs may have been previously encoded in languages, including but not limited to a high level programming language, or an interpreted language, or a different machine language, or even the same or a similar machine language, for example for a legacy processor.

Figure 4:
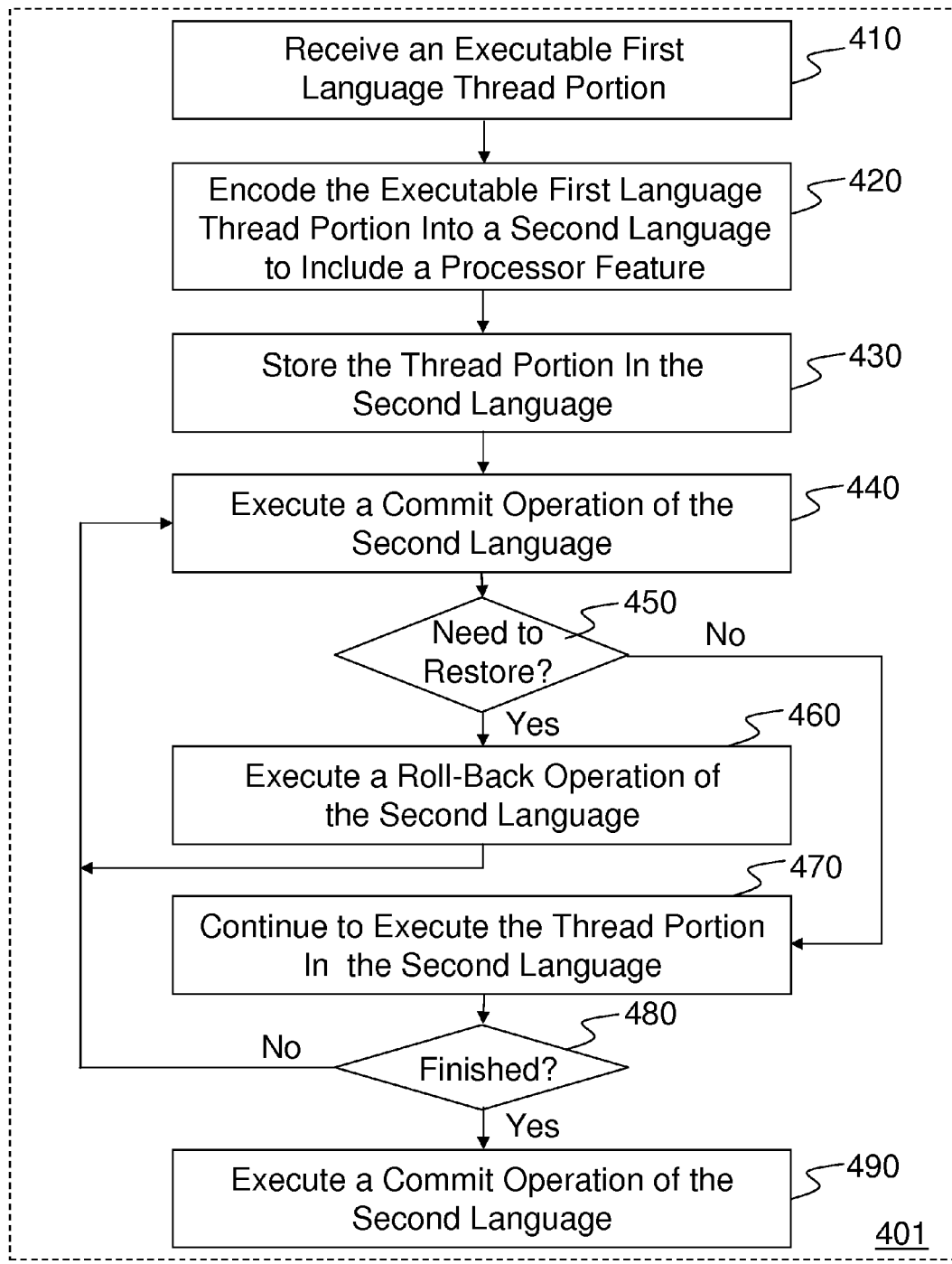
FIG. 4 illustrates a flow diagram for an alternative embodiment of a process to use hardware compilation and/or translation with fault detection and roll back functionality.

FIG. 4 illustrates a flow diagram for an alternative embodiment of a process to use hardware compilation and/or translation with fault detection and roll back functionality. In processing block 410 an executable thread portion is received in a processor encoded in a first language, for example, a high level programming language, or an interpreted language, or a machine language of a different processor architecture, or even the same or a similar machine language, i.e. for a legacy processor. In processing block 420 the executable thread portion is encoded into a second language to include one or more instruction to support new processor features not supported by the first language encoding. In processing block 430 the executable thread portion is stored in the second language, for example in system memory 260 and/or in a processor cache 240.

In processing block 440 a commit operation of the second language is executed to utilize the new processor features including recording an execution checkpoint state of registers, which are mapped to architectural registers. In processing block 550 a determination is made whether or not the registers mapped to architectural registers should be restored to a previous execution checkpoint state. If so, in processing block 560 a roll-back operation of the second language is executed to utilize the new processor features including restoring the previous execution checkpoint state, and processing proceeds until another commit operation is executed in processing block 440.

Otherwise in processing block 470 execution of the thread portion in the second language continues until it finishes in processing block 480. Then in processing block 490 another commit operation is executed to record another execution checkpoint state of registers, which are mapped to architectural register.

It will be appreciated that process 401 may, without significantly increasing implementation costs, provide fault tolerance and/or fault detection features that are atypical in high-production processors. In extreme environments where fault tolerance is a highly desirable feature of computer systems, commercial processors with hardware compilation and/or translation with roll back functionality may provide fault tolerance and/or fault detection along with advantages of high level integration, while being smaller and lighter, and having better power efficiency than other alternatives such as FPGA technology. Such features are increasingly desirable since reducing the dimensions and increasing the number of transistors in a package increases the probability of faults due to alpha particles and other causal factors.

Figure 5:
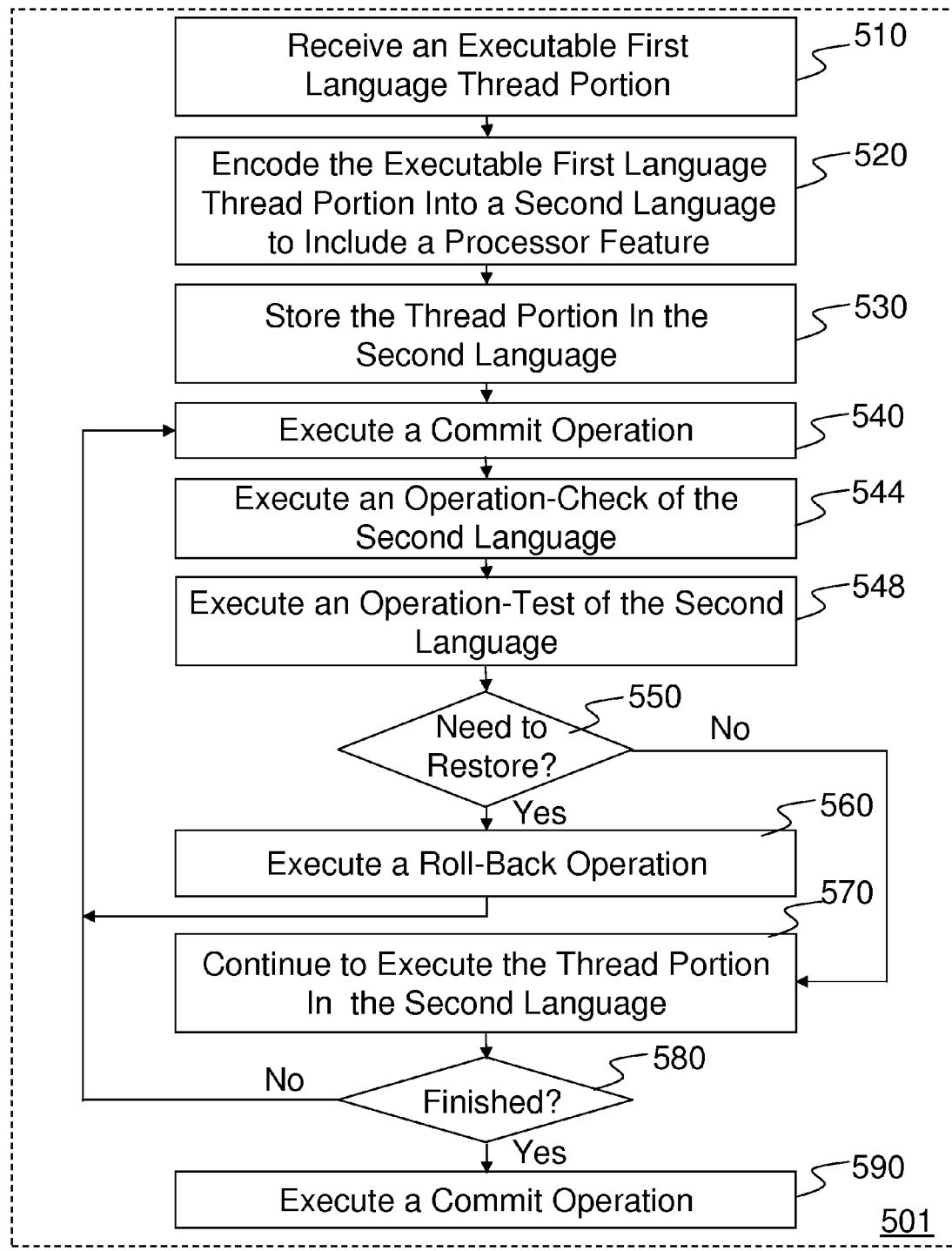
FIG. 5 illustrates a flow diagram for another alternative embodiment of a process to use hardware compilation and/or translation with fault detection and roll back functionality.

FIG. 5 illustrates a flow diagram for another alternative embodiment of a process 501 to use hardware compilation and/or translation with fault detection and roll back functionality. In processing block 510 an executable thread portion is received in a processor encoded in a first language, for example, a high level programming language, or an interpreted language, or a machine language of a different processor architecture, or even the same or a similar machine language, i.e. for a legacy processor. In processing block 520 the executable thread portion is encoded into a second language to include one or more instruction to support new processor features not supported by the first language encoding. In processing block 530 the executable thread portion is stored in the second language, for example in system memory and/or in a processor cache.

In processing block 540 a commit operation is executed recording an execution checkpoint state of registers, which are mapped to architectural registers. In processing block 544 an operation-check instruction of the second language is executed to utilize the new processor features including recording an operation result for a comparison by a future operation, for example to detect a fault or virus. In processing block 548 an operation-test instruction of the second language is executed to utilize the new processor features including a fault detection operation by comparing an operation result to a previous operation result. In processing block 550 a determination is made whether or not the registers mapped to architectural registers should be restored to a previous execution checkpoint state. If so, in processing block 560 a roll-back operation is executed to restore the previous execution checkpoint state, and processing proceeds until another commit operation is executed in processing block 540.

Otherwise in processing block 570 execution of the thread portion in the second language continues until it finishes in processing block 580. Then in processing block 590 another commit operation is executed to record another execution checkpoint state of registers, which are mapped to the architectural registers.

Through hardware compilation and/or translation, instructions to support new processor features may be used to improve performance, or fault tolerance, security, or virus detection, etc., by recompilation, translation or instrumentation of programs previously encoded in languages, which did not have support for these new processor features. It will be appreciated that such programs may have been previously encoded in languages, including but not limited to a high level programming language, or an interpreted language, or a different machine language, or even the same or a similar machine language, for example for a legacy processor.

It will also be appreciated that some embodiments supporting hardware compilation and/or translation with roll back functionality may, without significantly increasing implementation costs, provide fault tolerance and/or fault detection features that are atypical in high-production processors. In extreme environments where fault tolerance is a highly desirable feature of computer systems, commercial processors with hardware compilation and/or translation with roll back functionality may provide fault tolerance and/or fault detection along with advantages of high level integration, while being smaller and lighter, and having better power efficiency than other alternatives such as FPGA technology. Such features are increasingly desirable since reducing the dimensions and increasing the number of transistors in a package increases the probability of faults due to alpha particles and other causal factors.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method for deploying new processor features, the method comprising:
   receiving an executable thread portion in a processor;
   encoding the executable thread portion by recompilation, translation, or instrumentation to include one or more new instructions to support one or more new processor features not encoded in the encoding of the executable thread portion, wherein said one or more new instructions to support one or more new processor features comprises a roll-back instruction; and executing the executable thread portion to utilize said one or more new processor features.

2. The method of claim 1 wherein said one or more new processor features supported by the roll-back instruction comprises restoring registers mapped to architectural registers to a previous execution checkpoint state.

3. The method of claim 1 wherein said one or more new instructions to support one or more new processor features comprises a commit instruction.

4. The method of claim 3 wherein said one or more new processor features supported by the commit instruction comprises recording an execution checkpoint state of registers mapped to architectural registers.

5. The method of claim 3 wherein said one or more new processor features supported by the roll-back instruction and the commit instruction comprise speculative modification of state in registers mapped to architectural registers and restoration of those registers to a previous execution checkpoint state.

6. The method of claim 5 wherein said one or more new processor features supported by the roll-back instruction and the commit instruction comprise fault tolerance and fault detection.

7. The method of claim 5 wherein said one or more new processor features supported by the roll-back instruction and the commit instruction comprise virus detection.

8. The method of claim 1 wherein said one or more new instructions to support one or more new processor features comprises an operation-test instruction.

9. The method of claim 8 wherein said one or more new processor features supported by the operation-test instruction comprises a fault detection operation comparing an operation result to a previous operation result.

10. The method of claim 8 wherein said one or more new instructions to support one or more new processor features comprises an operation-check instruction.

11. The method of claim 10 wherein said one or more new processor features supported by the operation-check instruction comprises recording an operation result for a comparison by a future operation-test instruction.

12. An article of manufacture comprising:
a non-transitory machine-accessible medium storing data and instructions for supporting new processor features such that, when accessed by a machine, cause the machine to:
receive an executable thread portion in a processor;
encode the executable thread portion by recompilation, translation, or instrumentation to include one or more new instructions to support one or more new processor features not encoded in the executable thread portion, wherein said one or more new instructions to support one or more new processor features comprises a roll-back instruction; and
execute the executable thread portion to utilize said one or more new processor features.

13. The article of manufacture of claim 12 wherein said one or more new processor features supported by the roll-back instruction comprises restoring registers mapped to architectural registers to a previous execution checkpoint state.

14. The article of manufacture of claim 12 wherein said one or more new instructions to support one or more new processor features comprises a commit instruction.

15. The article of manufacture of claim 14 wherein said one or more new processor features supported by the commit instruction comprises recording an execution checkpoint state of registers mapped to architectural registers.

16. The article of manufacture of claim 14 wherein said one or more new processor features supported by the roll-back instruction and the commit instruction comprise speculative modification of state in registers mapped to architectural registers and restoration of those registers to a previous execution checkpoint state.

17. The article of manufacture of claim 16 wherein said one or more new processor features supported by the roll-back instruction and the commit instruction comprise fault tolerance and fault detection.

18. The article of manufacture of claim 16 wherein said one or more new processor features supported by the roll-back instruction and the commit instruction comprise virus detection.

19. A processor comprising:
logic to receive an executable program portion, and encode the executable program portion by recompilation, translation, or instrumentation to include one or more new instructions to support one or more new processor features not encoded in the executable program portion; and
an execution unit, responsive to said one or more new instructions to support the one or more new processor features, to execute:
an operation-check instruction to perform a first operation and record a result of the first operation for a comparison, and
an operation-test instruction to perform a second operation and a fault detection by comparing a result of the second operation to the recorded first operation result.

20. The processor of claim 19 wherein said execution unit, responsive to said one or more new instructions to support the one or more new processor features, is also to execute: a commit instruction to record an execution checkpoint state of registers mapped to architectural registers of the processor, and a roll-back instruction to restore the registers mapped to architectural registers of the processor to the execution checkpoint state.

21. A multiprocessor comprising:
logic to receive a first executable program portion, and encode the first executable program portion by recompilation, translation, or instrumentation to include one or more new instructions to support one or more new processor features not encoded in the first executable program portion; and
a first execution unit, responsive to said one or more new instructions to support the one or more new processor features, to execute:
a first commit instruction to record a first execution checkpoint state of registers mapped to architectural registers of the first executable program portion, and
a first roll-back instruction to restore the registers mapped to architectural registers of the first executable program portion to the first execution checkpoint state.

22. The multiprocessor of claim 21 wherein said logic is to receive a second executable program portion, and encode the second executable program portion by recompilation, translation, or instrumentation to include the one or more new instructions to support the one or more new processor features not encoded in the second executable program portion, the multiprocessor comprising: a second execution unit, responsive to said one or more new instructions to support the one or more new processor features, to execute: a second commit instruction to record a second execution checkpoint state of registers mapped to architectural registers of the second executable program portion, and a second roll-back instruction to restore the registers mapped to architectural registers of the second executable program portion to the second execution checkpoint state.

23. The multiprocessor of claim 22 wherein the registers mapped to architectural registers of the first executable program portion, and the registers mapped to architectural registers of the second executable program portion are allocated from the same physical register file in the multiprocessor.

24. The multiprocessor of claim 23 wherein said first and second execution units, responsive to said one or more new instructions to support the one or more new processor features, are also to execute: an operation-check instruction to perform a first operation and record a result of the first operation for a comparison, and an operation-test instruction to perform a second operation and a fault detection by comparing a result of the second operation to the recorded first operation result.

25. A computing system comprising:
an addressable memory to store a first executable program portion; and
a multiprocessor including:
  logic to receive the first executable program portion and encode the first executable program portion by recompilation, translation, or instrumentation to include one or more new instructions to support one or more new processor features not encoded in the first executable program portion; and
  a first execution unit, responsive to said one or more new instructions to support the one or more new processor features, to execute:
    a first commit instruction to record a first execution checkpoint state of registers mapped to architectural registers of the first executable program portion, and
    a first roll-back instruction to restore the registers mapped to architectural registers of the first executable program portion to the first execution checkpoint state.

26. The computing system of claim 25 wherein said addressable memory is to store a second executable program portion, and wherein said logic is to receive the second executable program portion and encode the second executable program portion by recompilation, translation, or instrumentation to include the one or more new instructions to support the one or more new processor features not encoded in the second executable program portion, the multiprocessor comprising: a second execution unit, responsive to said one or more new instructions to support the one or more new processor features, to execute: a second commit instruction to record a second execution checkpoint state of registers mapped to architectural registers of the second executable program portion, and a second roll-back instruction to restore the registers mapped to architectural registers of the second executable program portion to the second execution checkpoint state.

27. The computing system of claim 26 wherein said first and second execution units, responsive to said one or more new instructions to support the one or more new processor features, are also to execute: an operation-check instruction to perform a first operation and record a result of the first operation for a comparison, and an operation-test instruction to perform a second operation and a fault detection by comparing a result of the second operation to the recorded first operation result.

28. The computing system of claim 27 wherein the registers mapped to architectural registers of the first executable program portion, and the registers mapped to architectural registers of the second executable program portion are allocated from the same physical register file in the multiprocessor.

* * * * *